(No Model.)
J. DEAN.
VEHICLE WHEEL.
No. 505,701. Patented Sept. 26, 1893.
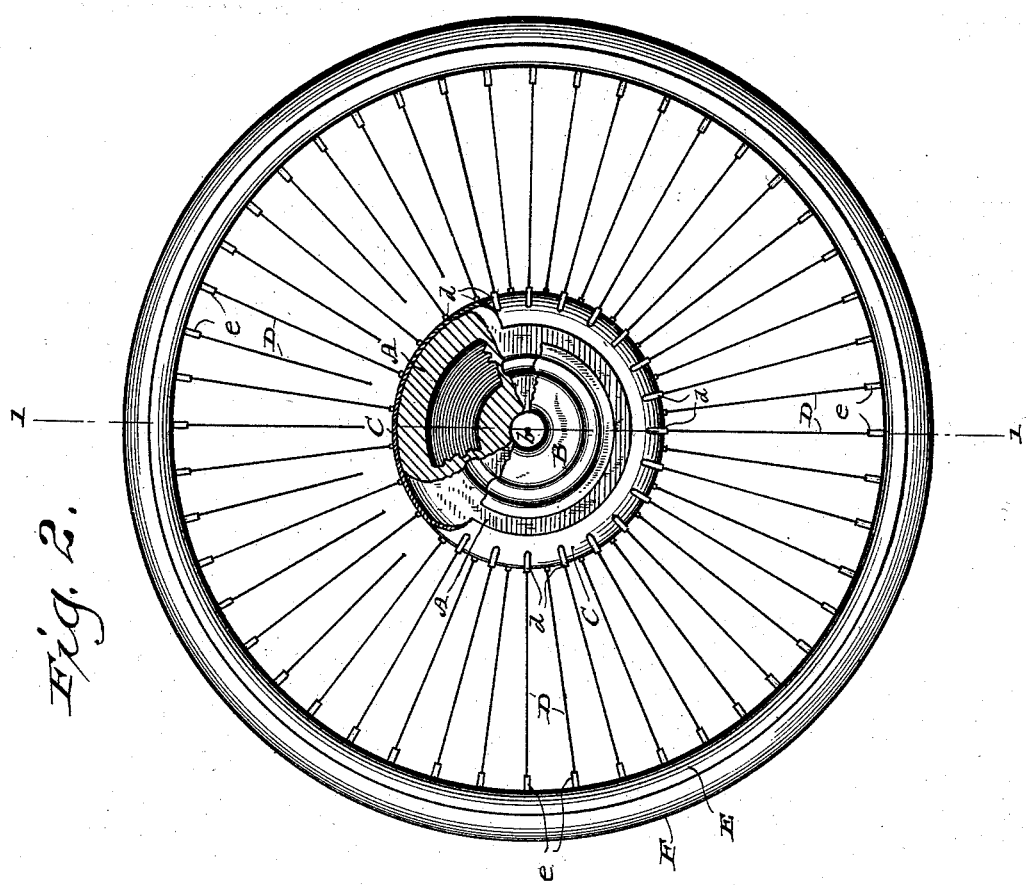
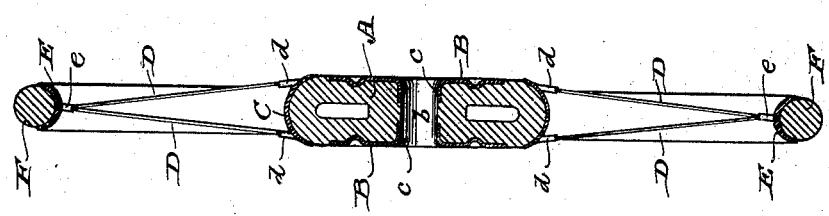

UNITED STATES PATENT OFFICE.

JOHN DEAN, OF RACINE, WISCONSIN, ASSIGNOR OF ONE-HALF TO JOHN P. DAVIES, OF SAME PLACE.

VEHICLE-WHEEL.

SPECIFICATION forming part of Letters Patent No. 505,701, dated September 26, 1893.

Application filed January 10, 1893. Serial No. 457,892. (No model.)

*To all whom it may concern:*

Be it known that I, JOHN DEAN, a citizen of the United States, and a resident of Racine, in the county of Racine, and in the State of Wisconsin, have invented certain new and useful Improvements in Vehicle-Wheels; and I do hereby declare that the following is a full, clear, and exact description thereof.

My invention has for its object to provide a vehicle wheel having means for the absorption of vibration arranged intermediate of the axis and rim.

The said invention therefore consists in certain peculiarities of construction and combination of parts hereinafter described with reference to the accompanying drawings and subsequently claimed.

In the drawings Figure 1 represents a vertical transverse section taken on line 1—1 of the succeeding figure, and Fig. 2 a side elevation of one form of a vehicle wheel constructed according to my invention and having parts thereof broken away.

That form of my improved vehicle wheel herein illustrated has a central portion or cushion A of elastic material such as rubber, either solid, hollow or air-inflated as may be found most desirable in practice for vehicles of various descriptions. The cushion has a central aperture $b$ for the engagement of an axle, and I prefer to bush this aperture with metallic plates B having inturned flanges $c$, the latter protecting the material of said cushion against wear on the axle with which it may be engaged. As shown the metallic plates extend some distance along the sides of the cushion and are preferably indented into the latter as a means for retaining them in place.

Encircling the cushion A and held in place thereon, by cement or other suitable means, is a metal band C provided with sockets $d$ for spokes D that engage nipples $e$ extended inward from a metal rim E and fast on this rim is an elastic tire F, the one shown being of solid rubber, although any form of the ordinary cushion or pneumatic tire may be substituted. The band and rim herein described are preferably concave, the concavity of each being proportionate to the contour of the elastic device engaged therewith.

The wheel herein shown, and particularly specified, is designed for a bicycle, the cushion A being for the absorption of any amount of vibration that is not taken up by the elastic tire, but it is to be understood that my invention is applicable to any vehicle wheel without regard to structural peculiarity of its tire, the said invention consisting broadly in an elastic cushion interposed between the axis and rim of said wheel for the purpose of absorbing vibration.

Various styles of vehicles and the material composing the major portion of their wheels necessitate certain mechanical variations in the application of the cushions A, but in any event these cushions are interposed between the axis and rim of said wheels, and therefore I have deemed it sufficient to show but one form of wheel constructed according to my invention.

Having thus described my invention, what I claim as new, and desire to secure by Letters Patent, is—

1. A vehicle wheel comprising a central chambered elastic cushion having an aperture for engagement with an axle, inturned metallic plates secured to the sides of the cushion a band encircling the cushion, a rim, and spokes connecting the band and rim, substantially as set forth.

2. A vehicle wheel comprising a central elastic cushion having an aperture for engagement with an axle, metallic plates secured to the sides of the cushion and provided with inturned flanges that engage said aperture, a band encircling the cushion, a rim, and spokes connecting the band and rim, substantially as set forth.

In testimony that I claim the foregoing I have hereunto set my hand, at Racine, in the county of Racine and State of Wisconsin, in the presence of two witnesses.

JOHN DEAN.

Witnesses:
MARY THIESEN,
C. J. THIESEN.